A. C. MENNINGEN.
CATERPILLAR TRACTOR DEVICE.
APPLICATION FILED APR. 21, 1919.
1,331,869.
Patented Feb. 24, 1920.
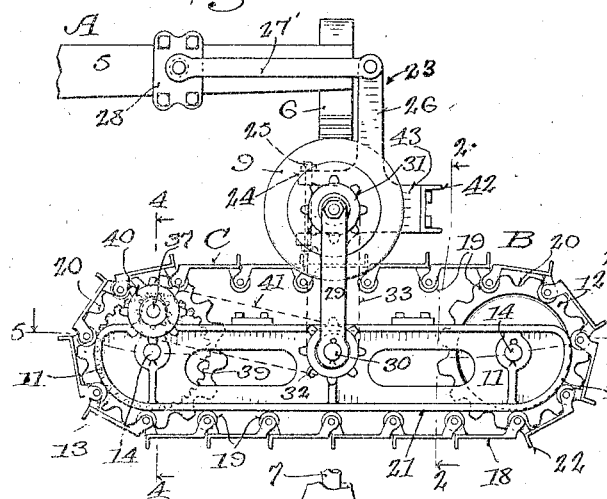
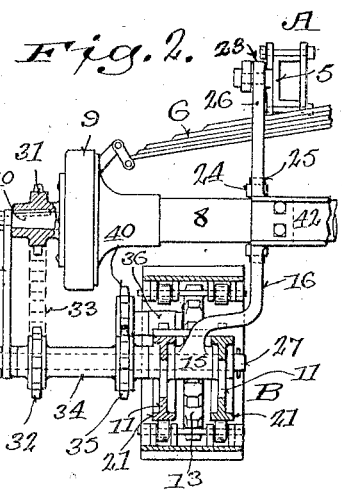
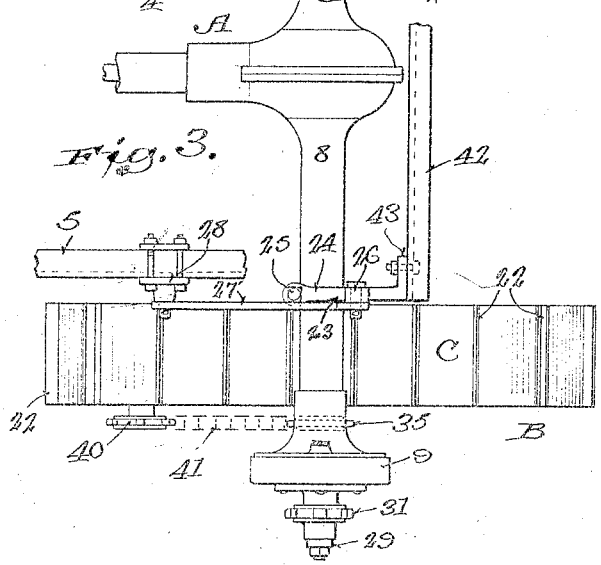
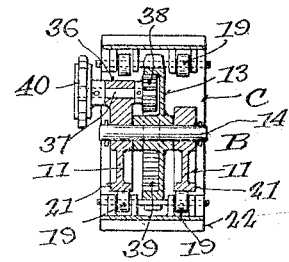
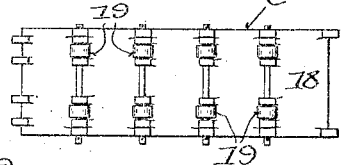
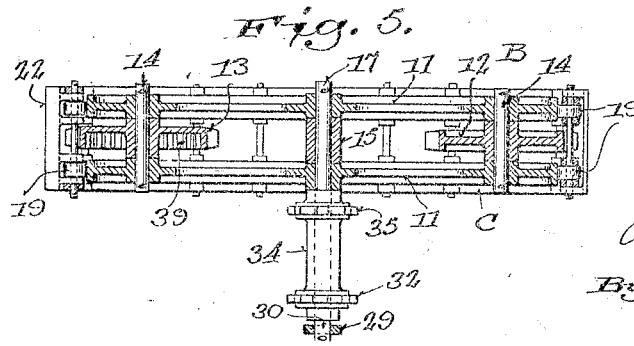

UNITED STATES PATENT OFFICE.

ADOLPH C. MENNINGEN, OF WEST ALLIS, WISCONSIN, ASSIGNOR OF ONE-HALF TO GERLINGER STEEL CASTING CO., OF WEST ALLIS, WISCONSIN, A CORPORATION OF WISCONSIN.

CATERPILLAR-TRACTOR DEVICE.

1,331,869.  Specification of Letters Patent.  Patented Feb. 24, 1920.

Application filed April 21, 1919. Serial No. 291,514.

*To all whom it may concern:*

Be it known that I, ADOLPH C. MENNINGEN, a citizen of the present Government of Germany and who am about to receive my second papers of citizenship in the United States, and resident of West Allis, in the county of Milwaukee and State of Wisconsin, have invented new and useful Improvements in Caterpillar-Tractor Devices, of which the following is a description, reference being had to the accompanying drawings, which are a part of this specification.

This invention relates to traction devices, and pertains especially to a tractor attachment for an ordinary automobile whereby the latter may be quickly and easily converted into a tractor of the self-laying track, or caterpillar type, and adapted to agricultural and other uses and still enable the automobile to be readily reconverted into a pleasure car.

The primary object of the present invention is to provide a novel form of tractor attachment for motor vehicles which will be entirely disposed beneath the axle housing, and which will have a pivotal connection with the vehicle chassis frame and axle housing, the pivot being disposed adjacent the ground engaging portion of the tractor, whereby the same will be free to oscillate to conform to any undulation or unevenness of ground without affecting the driving connection or causing any unnecessary jar to the vehicle.

A further object of this invention is to provide a compact tractor attachment for motor vehicles which will be of simple and efficient construction and which will be capable of ready attachment to or detachment from the vehicle.

With the above and other objects in view which will appear as my description proceeds, my invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing I have illustrated one complete example of the physical embodiment of my invention constructed according to the best mode I have so far devised for the practical application of the principles thereof, in which:

Figure 1 is a side view in elevation of my invention, only a portion of the chassis frame being shown;

Fig. 2 is a view part in section and part in elevation, said view being taken on the line 2—2 of Fig. 1;

Fig. 3 is a plan view of my invention, only one side of the differential housing being shown, and part of my invention being broken away and in section for the purpose of illustration;

Fig. 4 is a sectional view taken on the line 4—4 of Fig. 1;

Fig. 5 is a sectional view taken longitudinally through the tractor attachment on the line 5—5 of Fig. 1; and Fig. 6 is a plan view of a section of the link belt used in connection with my tractor attachment.

Referring to the drawing in detail, A indicates a suitable form of motor vehicle, 5 the chassis frame, 6 the rear spring, 7 the rear driving shaft, 8 the differential housing, 9 the brake drums, 10 the axle spindles on which the rear wheels (not shown) are secured, and B the tractor attachment in general.

The tractor attachment consists of a pair of like elongated plates 11 spaced apart by sprocket wheels 12 and 13 journaled therebetween near each end thereof by means of shafts 14, and the end 15 of a supporting arm 16 pivoted on the portion of the shaft 17 intermediately journaled to the members 11.

A suitable link belt traction means C is trained around the sprockets 12 and 13 and have provided at the junction of the links 18 on the belt and on the inner side thereof a series of rollers 19 adapted for engagement with the recesses 20 of the sprocket members and adapted to track the lower edges 21 of the frame 11, the outer ends of the frames 11 being curved as at 11' to conform with the arc described by the rollers while engaged with the sprocket members. The portion of the belt C disposed above the frames 11 is merely stretched between the sprockets as best shown in Fig. 1, and the outer surface of the belt is provided with projections 22 to form suitable tread members.

The tractor attachment B is pivotally secured with the vehicle chassis frame 5 and the axle housing 8 by means of a bracket member 23 having an intermediate U-shaped portion 24 adapted to be engaged thereto by a fastening 25, the bracket having the downwardly extending frame 16 (before described) and an upwardly extending frame 26 pivotally receiving at its free end one end of a link 27' having its other end pivoted to a securing member 28 fastened to the chassis frame, whereby the axle housing is permitted a vertical movement, but held against orbital movement.

Coöperating with the bracket member 23 to support the tractor attachment from the axle housing, is a vertically extending link or arm 29 having its upper end secured to the end of axle spindle 10 and its lower end pivotally connected with the outer end 30 of shaft 27 which is extended outwardly from the attachment. The method just described of supporting the attachment from the axle housing permits the ready vertical movement of the tractor with the housing 8 when the spring 6 is compressed, prevents orbital movement of the housing 8, and permits the pivotal movement of the tractor attachment on shaft 27. The shaft 27 is on a plane substantially parallel with the pivot 14 of the sprocket wheels, and as depicted in Fig. 1 is comparatively near the ground engaging portion of the attachment, whereby the attachment is free to ride or conform to any undulation or unevenness in the ground surface.

The power from the drive axle is transmitted to the belt C through the medium of a series of gear attachments hereinafter described. A sprocket gear 31 is secured to the spindle 10, between the link 29 and brake drum 9, said brake drum being carried by the inner end of said sprocket wheel, and in drive connection with a sprocket wheel 32 by means of a chain connection 33. The sprocket wheel 32 is journaled on the portion of shaft 27 intermediate link 29 and the outermost frame member 11, and has its hub inwardly projected as at 34, and formed integral therewith on its inner end is a sprocket wheel 35.

The outer frame member 11 has formed thereon above the bearing of shaft 14 of sprocket wheel 13, a bearing member 36 in which is journaled a shaft 37 having fixed on its inner end a pinion 38 in mesh with an internal gear 39 on the sprocket wheel 13, the other end of shaft 37 having fixed thereon a sprocket wheel 40 connected with sprocket wheel 35 by a chain connection 41. Thus it will be readily seen the power from the drive shaft is transmitted to the belt C through gear 32 by means of chain 33 connecting sprocket wheels 32 and 31 to sprocket wheel 40 by means of chain connection 41 with sprocket wheel 35, the hub of which is integral with the hub of gear 32, and to the drive sprocket wheel 13 by means of pinion 38 engaging the internal gear of said drive sprocket 13, the drive sprocket rotating the belt C, as will be obvious.

As will be readily understood, a tractor attachment B is connected with each end of axle housing 8 and a transverse brace rod 42 connects each bracket member 23 engaging a rearwardly projecting enlargement 43 formed integral with each bracket member, this brace 42 giving added strength to the structure as will be obvious.

What I claim as my invention is:

1. The combination with a motor vehicle drive axle and chassis frame, of a tractor attachment pivotally engaged with said axle, said tractor attachment being disposed beneath and spaced from the axle, means engaged with the chassis frame for securing the tractor attachment against orbital movement, and means for transmitting power from the rear axle to said tractor attachment.

2. The combination with a motor vehicle supporting drive axle and chassis frame, of a tractor attachment, a bracket member pivotally securing the attachment to, and spacing the same from and beneath the drive axle, the pivotal connection between said attachment and said bracket being adjacent the ground engaging portion of the tractor, means connecting said bracket member and the chassis frame to prevent orbital movement of said tractor attachment, and means for transmitting power from the rear axle to the tractor attachment.

3. The combination with a motor vehicle drive axle, an axle housing surrounding the same, a chassis frame, of a tractor attachment, means connected with said tractor attachment and engaging the chassis frame, axle housing and tractor attachment for pivotally securing the attachment with the vehicle, and means for transmitting power from the rear axle to the tractor attachment.

4. The combination with a motor vehicle including a drive axle and chassis frame, the former being vertically movable with respect to the latter, of a bracket carried by the drive axle and extended below the same, a tractor attachment pivoted to the lower end of the bracket, a link connection between said bracket and the chassis frame for holding the pivot of said attachment against orbital movement, and means for transmitting power from the rear axle to the tractor attachment.

5. The combination with a motor vehicle drive axle, a chassis frame, the former being vertically movable with respect to the latter, of a tractor attachment and means for securing the attachment with the drive axle, a frame comprising a bracket extending below and above the axle, said attachment being pivoted to the lower end of the bracket, a link connecting the upper end of the bracket with the chassis frame, and means for transmitting power from the drive axle to said tractor attachment.

6. The combination with a motor vehicle including a drive axle, an axle housing surrounding the same and a chassis frame, the former being vertically movable with respect to the latter, of a tractor attachment, a bracket adapted to pivotally engage the axle housing and extending below and above said housing, the lower end of said bracket being pivotally engaged with the tractor attachment, a link connecting the upper end of the bracket with the chassis frame, and means for transmitting power from the drive axle to the tractor attachment.

7. The combination with a motor vehicle including a drive axle, an axle housing surrounding the same and a chassis frame, the former being vertically movable with respect to the latter, of a tractor attachment, a bracket adapted to pivotally engage the axle housing and extending below and above said housing, the lower end of said bracket being pivotally engaged with the tractor attachment, a link connecting the upper end of the bracket with the chassis frame, a second link having its upper end secured to the outer end of the drive axle and its lower end pivotally engaged with the traction attachment in axial alinement with the pivot of the lower end of said bracket, and means for transmitting power from the drive axle to the tractor attachment.

8. The combination with a motor vehicle drive axle, axle housing surrounding the same and chassis frame, of a tractor attachment, means for pivotally securing the attachment with the vehicle, said tractor attachment including a pair of spaced elongated frame members, a sprocket wheel pivoted between said frame members near one end and a drive sprocket wheel pivoted between the frame members near the other end, a link belt trained about said sprocket wheels, an internal gear formed integral with the last mentioned sprocket wheel, a pinion gear in mesh with said internal gear, a sprocket gear connected with said pinion gear, a second sprocket gear journaled to the pivot of said attachment, means connecting said sprocket gears, and means connecting the last mentioned sprocket gear with the drive axle.

9. A device of the class described comprising a bracket member pivotally engaged, intermediate its ends, with a supporting axle, a tractor attachment disposed beneath the supporting axle, one end of said bracket being pivotally engaged with the tractor attachment near its ground engaging portion, and means carried by the other end of the bracket member and connected with a chassis frame.

10. A traction device comprising a bracket member engaged with a supporting axle and having an upper and a lower arm, a tractor attachment disposed entirely beneath the supporting axle and including a ground engaging portion, the lower arm of the bracket member being pivoted to the tractor attachment near its ground engaging portion, and means connected with the upper arm of the bracket member to prevent orbital movement.

11. A traction device comprising a bracket member engaged with a supporting axle and having an upper and a lower arm, a tractor attachment disposed entirely beneath the supporting axle, the lower arm of the bracket having a pivoted connection with the tractor attachment, and means connected with the upper arm of the bracket member to prevent orbital movement of bracket member and tractor attachment.

In testimony whereof, I affix my signature.

ADOLPH C. MENNINGEN.